United States Patent
Majumder et al.

(10) Patent No.: US 10,122,163 B2
(45) Date of Patent: Nov. 6, 2018

(54) SCALABLE SWITCHYARD FOR INTERCONNECTING DIRECT CURRENT POWER NETWORKS

(71) Applicant: ABB Schweiz AG, Baden (CH)

(72) Inventors: Ritwik Majumder, Västerås (SE);
Bertil Berggren, Västerås (SE);
Giovanni Velotto, Västerås (SE);
Tomas Jonsson, Linköping (SE);
Soubhik Auddy, Kolkata (IN); Jenny Josefsson, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 7 days.

(21) Appl. No.: 15/542,354

(22) PCT Filed: Jan. 30, 2015

(86) PCT No.: PCT/EP2015/051928
§ 371 (c)(1),
(2) Date: Jul. 7, 2017

(87) PCT Pub. No.: WO2016/119875
PCT Pub. Date: Aug. 4, 2016

(65) Prior Publication Data
US 2018/0278047 A1 Sep. 27, 2018

(51) Int. Cl.
*H02H 7/00* (2006.01)
*H02H 7/22* (2006.01)
(Continued)

(52) U.S. Cl.
CPC .................. *H02H 7/22* (2013.01); *H02B 1/24* (2013.01); *H02J 1/00* (2013.01)

(58) Field of Classification Search
CPC ...................................................... H02H 7/22
See application file for complete search history.

(56) References Cited

U.S. PATENT DOCUMENTS 7,508,636 B2 * 3/2009 Sellier ................... H01H 3/222
361/2
8,803,358 B2 * 8/2014 Hafner ................... H02H 7/268
307/113
(Continued)

FOREIGN PATENT DOCUMENTS

WO    WO 2011/057675 A1    5/2011
WO    WO 2013/068046 A1    5/2013
(Continued)

OTHER PUBLICATIONS

International Preliminary Report on Patentability, issued in PCT/EP2015/051928, dated Feb. 2, 2017.
(Continued)

*Primary Examiner* — Stephen W Jackson
(74) *Attorney, Agent, or Firm* — Birch, Stewart, Kolasch & Birch, LLP

(57) ABSTRACT

The invention concerns a switchyard for interconnecting direct current power networks and a direct current power transmission system comprising such a switchyard. The switchyard comprises a number of interconnected entities comprising at least two main circuit breakers and a number of transfer switches, where each network has two connections to the switchyard, at least one via a transfer switch, each main circuit breaker has four connections in the switchyard, two at each end of the main circuit breaker and at least one via a transfer switch, and each network is joined with every other network via a corresponding path through at least one main circuit breaker as well as via a corresponding path bypassing all main circuit breakers.

20 Claims, 8 Drawing Sheets

(51) Int. Cl.
*H02J 1/00* (2006.01)
*H02B 1/24* (2006.01)

(56) References Cited

U.S. PATENT DOCUMENTS

| | | | |
|---|---|---|---|
| 8,830,636 B2 * | 9/2014 | Asplund | H02J 3/36 |
| | | | 361/62 |
| 9,000,623 B2 * | 4/2015 | Berggren | H02H 7/268 |
| | | | 307/113 |

FOREIGN PATENT DOCUMENTS

| | | |
|---|---|---|
| WO | WO 2014/090316 A1 | 6/2014 |
| WO | WO 2014/117813 A1 | 8/2014 |

OTHER PUBLICATIONS

International Search Report, issued in PCT/EP2015/051928, dated Dec. 7, 2015.
Written Opinion of the International Searching Authority, issued in PCT/EP2015/051928, dated Dec. 7, 2015.

* cited by examiner

SCALABLE SWITCHYARD FOR INTERCONNECTING DIRECT CURRENT POWER NETWORKS

TECHNICAL FIELD

The invention generally relates to direct current power transmission. More particularly, the invention relates to a switchyard for interconnecting at least three direct current power networks and a direct current power transmission system comprising such a switchyard.

BACKGROUND

The provision of circuit breakers in direct current transmission systems has during a long time been a serious challenge because of the lack of current zero crossings in the DC current.

One way of addressing this problem is through the use of a hybrid circuit breaker. One example of this circuit breaker is the hybrid circuit breaker described in WO 2011/057675. The circuit breaker comprises at least one main circuit breaking block comprising a branch with a number of series-connected power semiconductor switches. In parallel with this branch there is a non-linear resistor, such as a varistor. The main circuit breaker may then be made up of a series of such main circuit breaker blocks. In parallel with the main circuit breaker blocks there is a series-connection of an ultrafast mechanical disconnector and a load commutation switch, which load commutation switch is also made up of a number of series-connected power semi-conductor devices. The ultrafast mechanical disconnector and load commutation switch together make up a transfer switch.

This type of hybrid circuit breaker has the following operation:

When the circuit breaker is to be opened, the load commutation switch first opens, which commutates the current to the main circuit breaker. Thereafter the ultrafast mechanical disconnector is opened for mechanically disconnecting the load commutation switch. Finally the main circuit breaker is opened, which commutates the current into the non-linear resistor. It is then also possible to use standard type or conventional disconnectors to mechanically separate the hybrid circuit breaker from the DC system.

In WO 2011/057675 every hybrid circuit breaker comprises such a transfer switch, which thus has the purpose of directing the current through the main circuit breaker.

In DC transmission systems it is nowadays also of interest to interconnect a number of DC networks via a switchyard.

In a development of this hybrid circuit breaker, the transfer switch is removed from the hybrid circuit breaker. When this is done it is possible to use only one main circuit breaker in the switchyard interconnecting a number of DC networks, where a number of transfer switches are used for directing current through this main circuit breaker. An example of the use of a single main circuit breaker for connection of three or four DC networks is disclosed in WO 2013/068046.

The document also discloses the use of two main circuit breakers in switchyard based on the use of two busbars. The provision of two main circuit breakers seems to be made in order to provide redundancy in case maintenance is required.

However, there is still room for improvement in the provision of a switchyard using more than one main circuit breaker and a number of transfer switches. There is more particularly a need for providing a structure that is easily scalable for adding more main circuit breakers and more DC network connections to a switchyard.

SUMMARY

One object of the invention is thus to provide an easily scalable switchyard.

This object is according to a first aspect of the invention achieved by a switchyard for interconnecting at least three direct current power networks, the switchyard comprising a number of interconnected entities comprising:

at least two main circuit breakers, and
a number of transfer switches,
wherein
each network has two connections to the switchyard, at least one being provided via a transfer switch,
each main circuit breaker has four connections in the switchyard, two at each end of the main circuit breaker, at least one being provided via a transfer switch, and
each network is joined with every other network via a corresponding path through at least one main circuit breaker as well as via a corresponding path bypassing all main circuit breakers.

This object is according to a second aspect also achieved by a direct current power transmission system comprising the switchyard of the first aspect.

The invention according to the above-mentioned aspects has a number of advantages. It provided a flexible structure that is easily scalable for use with more networks and more main circuit breakers.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is concerned with providing a switchyard for interconnecting different direct current (DC) networks, where a DC network may be a DC transmission line connected to a remote energy source or an energy source such as a converter converting to and from DC.

Figure 1:
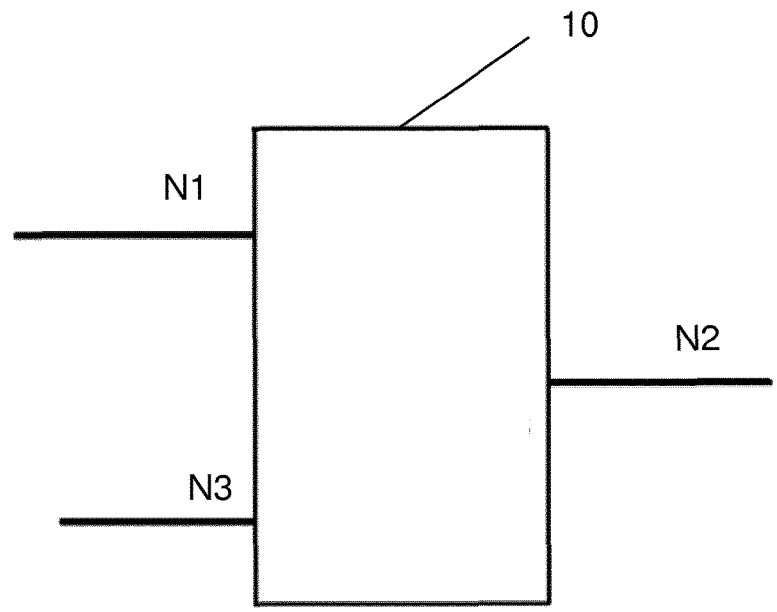
FIG. 1 schematically shows three DC networks interconnected via a switchyard,
FIG. 2 schematically shows a transfer switch,
FIG. 3 schematically shows a conventional disconnector.

FIG. 1 schematically shows a DC power transmission system comprising a number of DC networks interconnected via a switchyard 10. In the FIG. there are three DC networks, a first network N1, a second network N2 and a third network N3. As will become evident from the following description there may be several more DC networks connected to the switchyard 10.

The switchyard 10 is shown as having three DC network terminals, each terminal connected to a corresponding DC network in order to selectively connect and disconnect the various networks to and from each other. In order to do this it comprises a number of transfer switches, main circuit breakers and disconnectors. Furthermore the various DC networks may be connected in a DC grid.

There are different possible switchyard structures to realize these switches e.g. single breaker single bus bar, double breaker double bus bar etc. Furthermore, the strength of each DC network, in terms of source of fault current, connected to switchyard terminal can differ from Dc network to Dc network.

In the following, the switchyard will essentially be described as being made up of circuit breakers and transfer switches and used to connect the DC network terminals. It is implied in all the cases that these DC terminals are connected to a converter, such as a converter in a High Voltage Direct Current (HVDC) station through the DC networks. The switchyard may comprise other components, such as disconnectors. These other components will rarely be shown in order to focus on the specifics of the invention. It is however assumed that the disconnectors are deployed at the necessary places for isolations.

Figure 2:
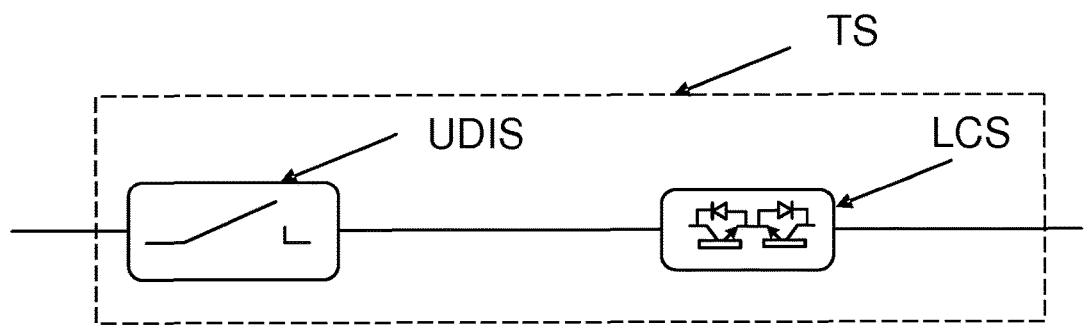

FIG. 2 schematically show one exemplifying transfer switch TS. The transfer switch comprises an ultrafast disconnector UDIS in series with a load commutation switch LCS. The load commutation switch LCS is with advantage realized in the form of a number of series-connected power semiconductor devices, such as power transistors. They may for instance be realized as Insulated Gate Bipolar Transistors (IGBTs). Each such transistor is furthermore equipped with an anti-parallel diode. It should be realised that there are a number of different components that can be used for a load commutation switch such as Integrated Gate-Commutated Thyristor (IGCT), Bimode Insulated Gate Transistor (BIGT) etc. Furthermore, an ultrafast disconnector UDIS is a mechanical disconnector set to achieve galvanic isolation at close to zero current conditions. As the name implies this galvanic separation is obtained fast, which in this case may be within one or a few ms, such as within 2 ms.

Figure 3:
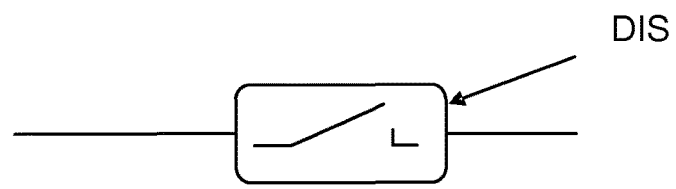

FIG. 3 schematically shows one exemplifying conventional disconnector DIS. The disconnector is typically a mechanical switch that is set to mechanically disrupt the conduction path of a conductor to which it is connected. The conventional disconnector DIS is also set to obtain galvanic isolation at zero current conditions. However, it is much slower than an ultrafast disconnector. It may for instance obtain galvanic separation within one or a few seconds.

The ultrafast disconnector is thus considerably faster than a conventional disconnector. It may as an example be at least one hundred times faster than a conventional disconnector.

The switchyard is also made up of main circuit breakers. It more particularly comprises at least two main circuit breakers.

Figure 4:
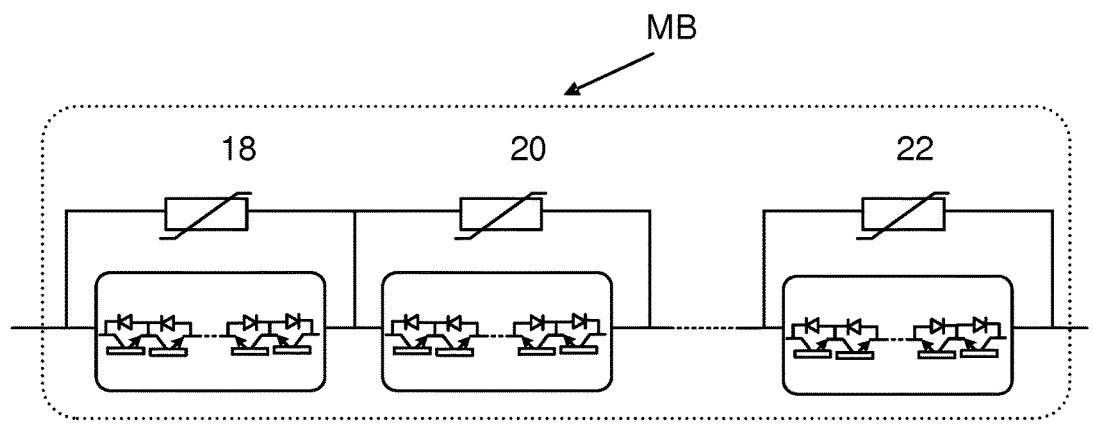
FIG. 4 shows a main circuit breaker comprising a number of main circuit breaker blocks.

FIG. 4 shows one example of a main circuit breaker MB. The main circuit breaker MB in FIG. 4 comprises a series connection of a number of main circuit breaker sections. In the figure a first 18, second 20 and $n^{th}$ section 22 is shown. Each section comprises a string of series connection power semiconductor devices. A power semiconductor device may also in this case be realized as a power transistor with anti-parallel diode, such as an IGBT with anti-parallel diode. Also here there are a number of different components that can be used in the main circuit breaker, such as IGCT, BIGT etc.

In each section there is also a non-linear resistor connected in parallel with the string of power semiconductor components, such a non-linear resistor may with advantage be a varistor.

As can be seen from what is described above, the same type of switching components are used in a transfer switch and a main circuit breaker. The main difference between these is that the main circuit breaker has many more series-connected power semiconductor devices than the transfer switch in order be able to withstand the full system voltage when these power semiconductor devices are blocked. The number of power semiconductor devices in the load commutation switch may be considerably fewer, since the load commutation switch only needs to withstand the forward voltage drop of the main circuit breaker.

A transfer switch is operated together with a main circuit breaker in order to break the current. This is typically done through the load commutation switch LCS of the transfer switch TS first opening, which commutates the current to an associated main circuit breaker MB. Thereafter the ultrafast mechanical disconnector UDIS of the same transfer switch TS is opened for mechanically disconnecting the load commutation switch LCS. Finally the main circuit breaker MB is opened, which commutates the current into the non-linear resistor(s).

Figure 5:
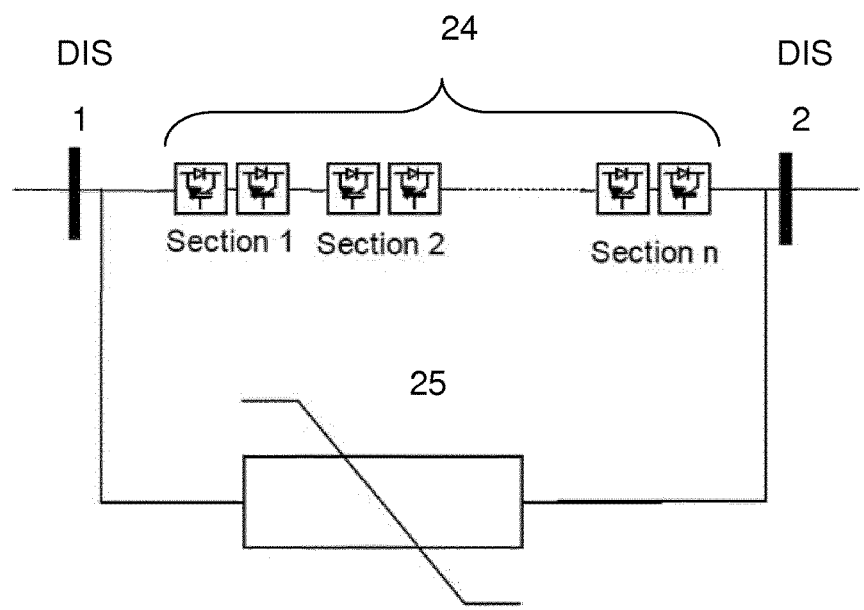
FIG. 5 shows a main circuit breaker made up of a single main circuit breaker blocks being connected between two mechanical disconnectors,
FIG. 6 schematically shows the principle of connecting a DC network to the switchyard.

FIG. 5 schematically shows another version of a main circuit breaker comprising only one string 24 of power semiconductor devices, which string is connected in parallel with a surge arrester such as a varistor 25. Here there is also shown a first disconnector DIS1 at a first end of the main circuit breaker and second disconnector DIS2 at a second end of the main circuit breaker. Also these disconnectors are provided for obtaining galvanic separation of the main circuit breaker from the conductors to which it is connected. This may be done in order to isolate the main circuit breaker. Furthermore, also these disconnectors may be conventional disconnectors.

Another difference between the main circuit breaker in FIG. 4 and FIG. 5 is that the main circuit breaker in FIG. 5 is unidirectional, while the main circuit breaker in FIG. 4 is bidirectional. This means that the main circuit breaker in FIG. 4 is able to break currents irrespective of the current direction through it, while the main circuit breaker in FIG. 5 is only able to break currents in one direction. It should be realized that any of these types maybe used in the switchyard. Which type is used may depend on the switchyard requirements.

The transfer switches and main circuit breakers are the main building blocks forming the switchyard.

The DC networks are connected to the switchyard in a certain fashion or according to a certain connectivity principle. Also the main circuit breakers are connected to the switchyard in a certain fashion or according to a certain connectivity principle.

Figure 6:
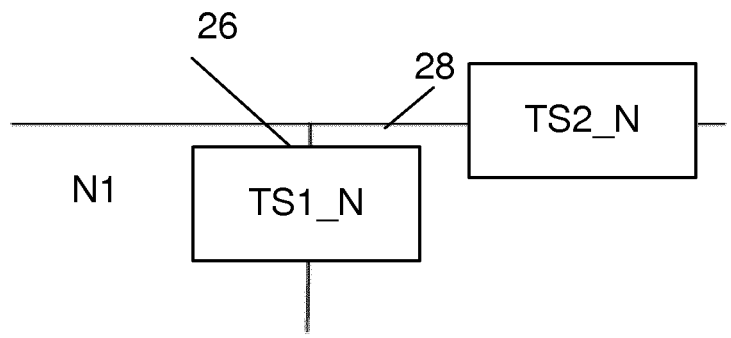
Figure 7:
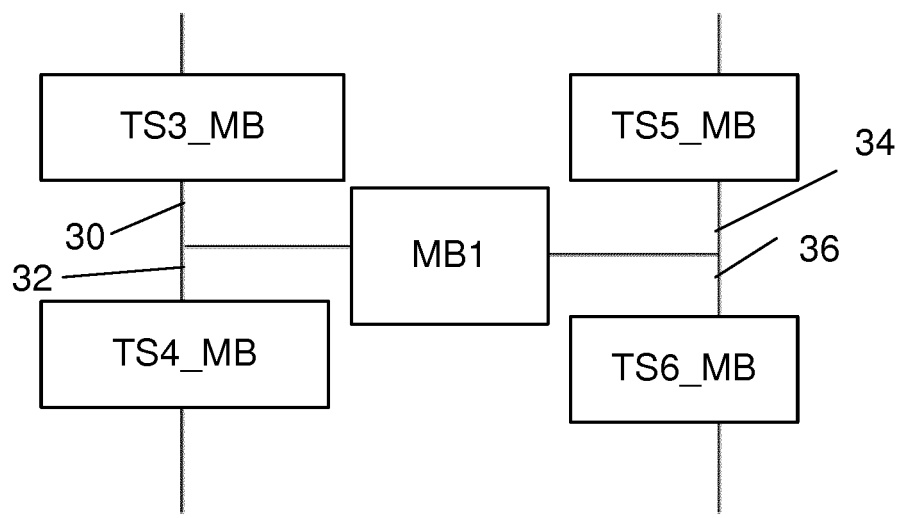
FIG. 7 shows the principle of connecting a main circuit breaker in the switchyard.

FIG. 6 shows the principle of how to connect a DC network to the switchyard and FIG. 7 shows the principle of how to connect a main circuit breaker in the switchyard.

As can be seen in FIG. 6 a first network N1 is connected to a switchyard using two connections, where each connection is made via corresponding transfer switch TS1_N and TS2_N. There is thus a first connection 26 between the network N and the switchyard comprising one transfer switch TS1_N and a second connection 28 between the network N and the switchyard comprising another transfer switch TS2_N.

As can be seen in FIG. 7, a first main circuit breaker MB1 is connected in the switchyard via four connections, two at each end. There is thus a first and second connection 30 and 32 at a first end of the main circuit breaker MB1, each comprising a corresponding transfer switch TS3_MB and TS4_MB as well as a third and fourth connection 34 and 36 at the second end of the main circuit breaker MB1, each comprising a corresponding transfer switch TS5_MB and TS6_MB.

The above-disclosed connection principles are then used for connecting a number of networks to a switchyard comprising two or more main circuit breakers. However, when interconnecting two entities, either a DC network or a main circuit breaker, then the transfer switches of these connections are shared. The path interconnecting the two connections only comprises one transfer switch. The two joined connections thus share transfer switch. It should be known that it is also possible that each such connection is made via one or two disconnectors, one on each side of the transfer switch. Furthermore, it should also be known that each main circuit breaker may be connected between two disconnectors as shown in FIG. 5.

Figure 8:
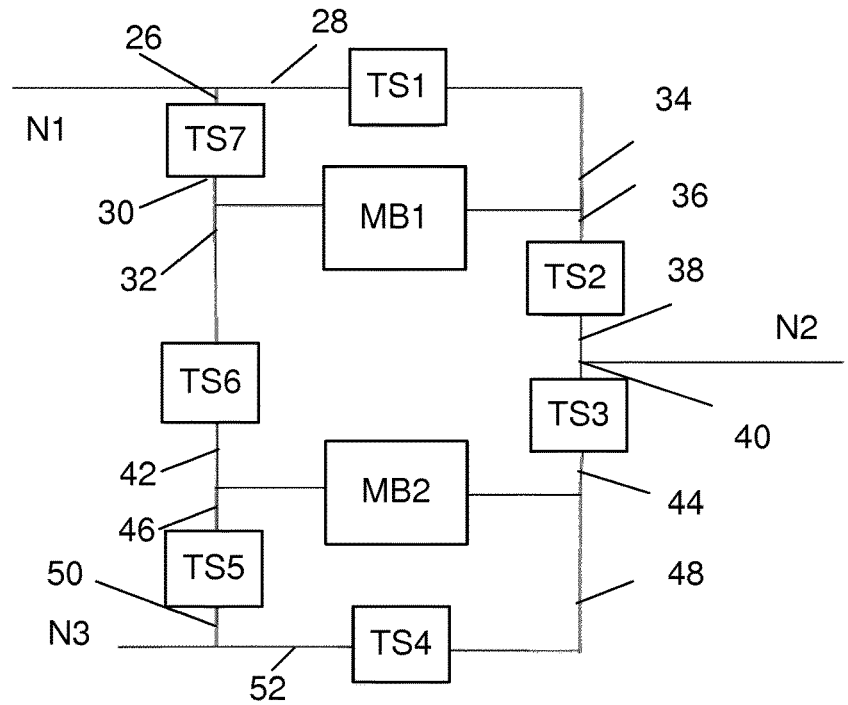
FIG. 8 shows an example of a first switchyard configuration connected to three DC networks and comprising two main circuit breakers.

FIG. 8 shows an example of a first switchyard configuration with two main circuit breakers that interconnects three different DC networks N1, N2 and N3.

It can be seen that a first connection 26 of the first network N1 is joined with a first connection 30 of a first main circuit breaker MB1 at a first end of the first main circuit breaker MB1, while a second connection 28 of the first network N1 is joined with a third connection 34 of the first main circuit breaker MB1 at a second end of the first main circuit breaker MB1.

A second connection 32 of the first main circuit breaker MB1 at the first end thereof is furthermore joined with a first connection 42 of a second main circuit breaker MB2 at the first end of the second main circuit breaker MB2, while a fourth connection 36 at the second end of the first main circuit breaker MB1 is joined with a first connection 38 of a second network N2.

It can also be seen that a second connection 44 of the second main circuit breaker MB2 at the second end thereof is joined with a second connection 40 of the second network N2, while a third connection 46 of the second main circuit breaker MB2 at the first end thereof is joined with a first connection 50 of the third network N3. A fourth connection 48 of the second main circuit breaker MB2 at the second end thereof is joined with a second connection 52 of the third network N3.

It can be seen that there is a transfer switch between two entities joined to each other in this way. There is thus a first transfer switch TS1 connected between the second connection 28 of the first network N1 and the third connection 34 of the first main circuit breaker MB1, a second transfer switch TS2 connected between the fourth connection 36 of the first main circuit breaker MB1 and the first connection 38 of the second network N2, a third transfer switch TS3 connected between the second connection 40 of the second network N2 and the second connection 44 of the second main circuit breaker MB2, a fourth transfer switch TS4 connected between the fourth connection 48 of the second main circuit breaker MB2 and the second connection 52 of the third network N3, a fifth transfer switch TS5 connected between the third connection 46 of the second main circuit breaker MB2 and the first connection 50 of the third network N3, a sixth transfer switch TS6 connected between the second connection 32 of the first main circuit breaker MB1 and the first connection 42 of the second main circuit breaker MB2 and finally a seventh transfer switch TS7 connected between the first connection 26 of the first network N1 and the first connection of the first main circuit breaker MB1.

Figure 9:
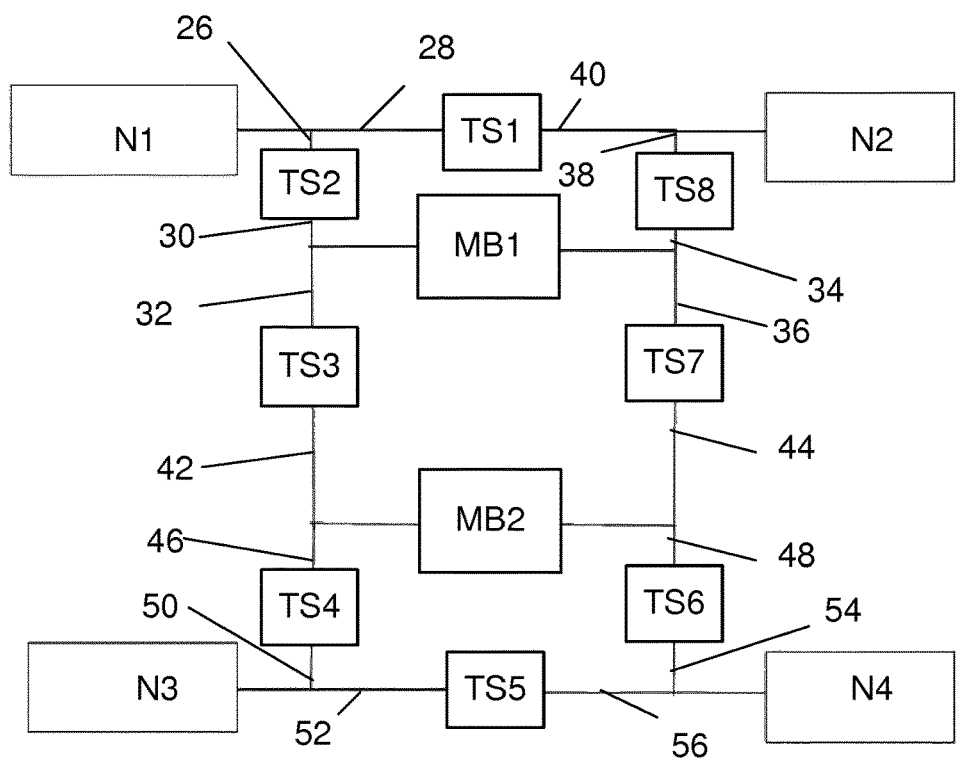
FIG. 9 shows an example of a second switchyard configuration connected to four DC networks and also comprising two main circuit breakers.

FIG. 9 shows an example of a second switchyard configuration with two main circuit breakers MB1 and MB2 that interconnect four different DC networks N1, N2, N3 and N4.

In this case the first connection 26 of the first network N1 is joined with the first connection 30 of a first main circuit breaker MB1 at the first end of the first main circuit breaker MB1 and the second connection 28 of the first network N1 is joined with the second connection 40 of the second network N2.

The second connection 32 of the first main circuit breaker MB1 at the first end thereof is joined with the first connection 42 of the second main circuit breaker MB2 at the first end of this second main circuit breaker MB2.

The first connection 38 of the second network N2 is joined with the third connection 34 of the first main circuit breaker MB1 at the second end of this first main circuit breaker MB1, while the fourth connection 36 of the first main circuit breaker MB1 at the second end thereof is joined with a 15 second connection 44 of the second main circuit breaker MS2 at the second end of the second main circuit breaker MB2. A third connection 46 of the second main circuit breaker MB2 at the first thereof is joined with the first connection of the third network N3, while a fourth connection 48 of the second main circuit breaker MB2 at the second end thereof is joined to a first connection 54 of the fourth network N4. The second connection 52 of the third network is finally joined with a second connection 56 of the fourth network N4.

It can also here be seen that there is a transfer switch between two entities joined to each other. There is thus a first transfer switch TS1 connected between the second connection 28 of the first network N1 and the second connection 40 of the second network N2, a second transfer switch TS2 connected between the first connection 26 of the first network N1 and the first connection 30 of the first main circuit breaker MB1, a third transfer switch TS3 connected between the second connection 32 of the first main circuit breaker MB1 and the first connection 42 of the second main circuit breaker MB2, a fourth transfer switch TS4 connected between the third connection 46 of the second main circuit breaker MB2 and the first connection 50 of the third network N3, a fifth transfer switch TS5 connected between the second connections 52 and 56 of the third and fourth networks N3 and N4, a sixth transfer switch TS6 connected between the fourth connection 48 of the second main circuit breaker MB2 and the first connection 54 of the fourth network N4, a seventh transfer switch TS7 connected between the fourth connection 36 of the first main circuit breaker MB1 and the second connection 44 of the second main circuit breaker MB2 and finally an eighth transfer switch TS8 connected between the second connection 38 of the second network N2 and the third connection 34 of the first main circuit breaker MB1.

When studying the two different switchyard configurations or topologies, some observations may be made. It can for instance be seen that each network is joined with every other network via a corresponding path through at least one main circuit breaker as well as via a corresponding path bypassing all main circuit breakers. Put differently, it can be seen that each main circuit breaker is connected between two networks via two network interconnecting transfer switches, one on each side of the main circuit breaker, where there is at least one bypass branch in parallel with the main circuit breaker, which bypass branch comprises a bypass transfer switch and is connected between the two network interconnecting transfer switches. It is in this context also assumed that all main circuit breakers are operational, i.e. possible to be controlled for circuit breaking operation. This means that bypass branches may exist between all networks when all main circuit breakers are operational.

In FIG. 8 the second and seventh transfer switches TS2 and TS7 form network interconnecting transfer switches for the first main circuit breaker MB1 and the first transfer switch TS1 forms the corresponding bypass transfer switch. In a similar manner the third and fifth transfer switches TS3 and TS5 form network interconnecting transfer switches for the second main circuit breaker MB2 and the fourth transfer switch TS4 forms the corresponding bypass transfer switch. In FIG. 9 the second and eighth transfer switches TS2 and TS8 form network interconnecting transfer switches for the first main circuit breaker MB1 and the first transfer switch TS1 forms the corresponding bypass transfer switch. Here the fourth and sixth transfer switches TS4 and TS6 form network interconnecting transfer switches for the second main circuit breaker MB2 and the fifth transfer switch TS5 forms the corresponding bypass transfer switch. There is also at least one circuit breaker interconnecting branch between the two circuit breakers and comprising a circuit breaker interconnecting transfer switch.

In FIG. 8 there is only one such circuit breaker interconnecting branch comprising the sixth transfer switch TS6, while in the FIG. 9 there are two circuit breaker interconnecting branches comprising the third and seventh transfer switches TS3 and TS7.

A switchyard constructed according to the above-mentioned principles has a flexibility of operation that is very high with a limited number of main circuit breakers and transfer switches. The switchyard may more particularly be selectively controlled during operation of the DC transmission system for letting fault currents pass through one or more of the main circuit breakers when performing fault current breaking operation, for instance based on the strength of the fault currents.

It should here be realized that in some situations the requirement for switchyard flexibility is limited, in which case the number of transfer switches may be reduced. It is for instance possible that only one of the network connections is made via a transfer switch and that only one of the main circuit breaker connections is provided via a transfer switch. As an alternative it is possible that at least one of the main circuit breaker connections on each side is provided via a transfer switch.

A few examples of handling faults in the two configurations or topologies of FIGS. 8 and 9 will now be given.

Figure 10:
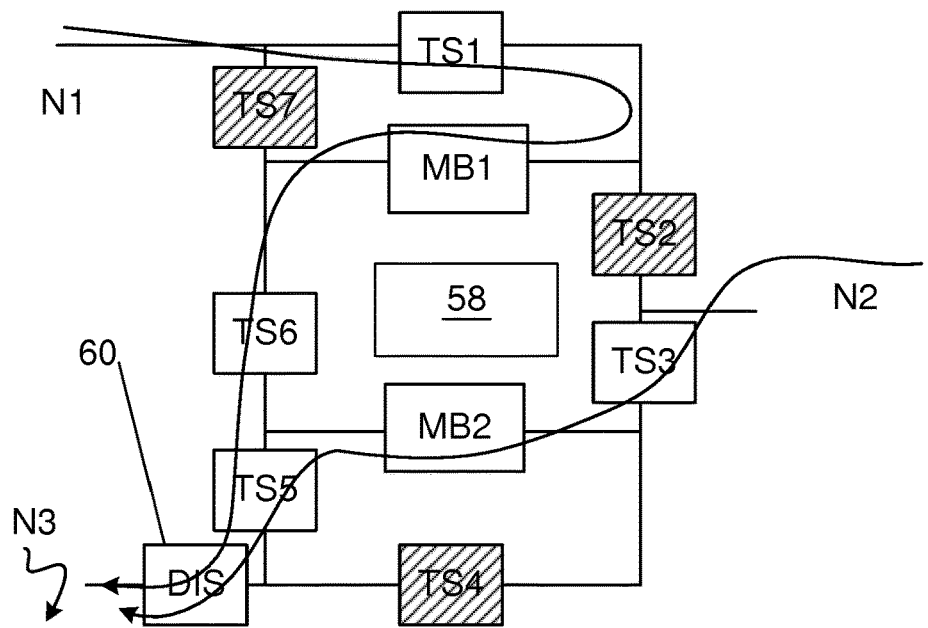
FIG. 10 shows operation of the first switchyard configuration during a fault in a third network.
Figure 11:
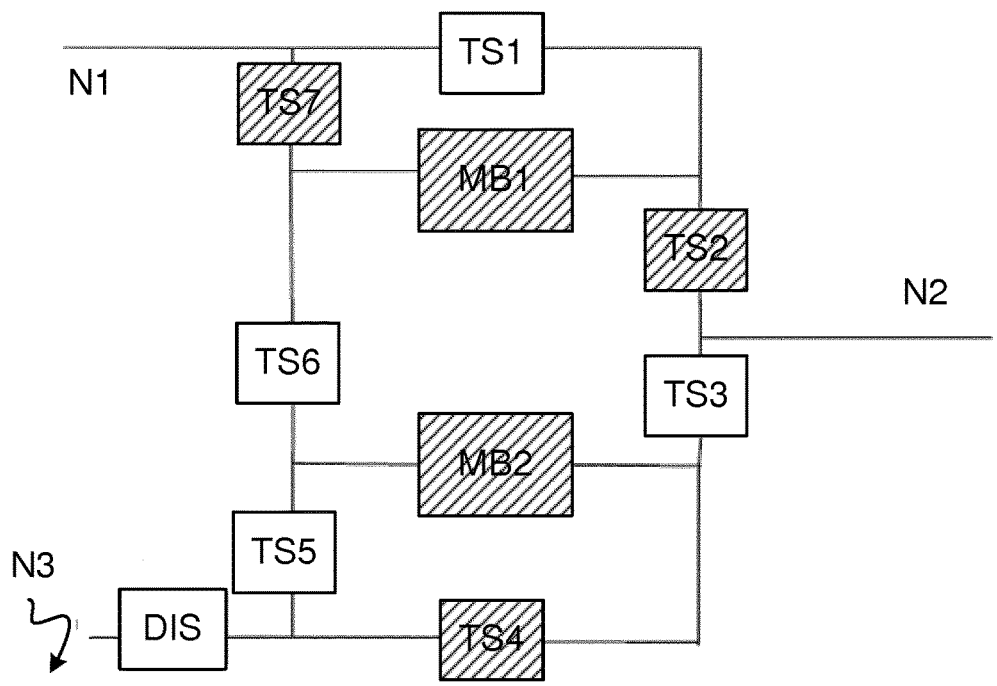
FIG. 11 shows operation of the first switchyard configuration during fault current breaking operation for the same fault.
Figure 12:
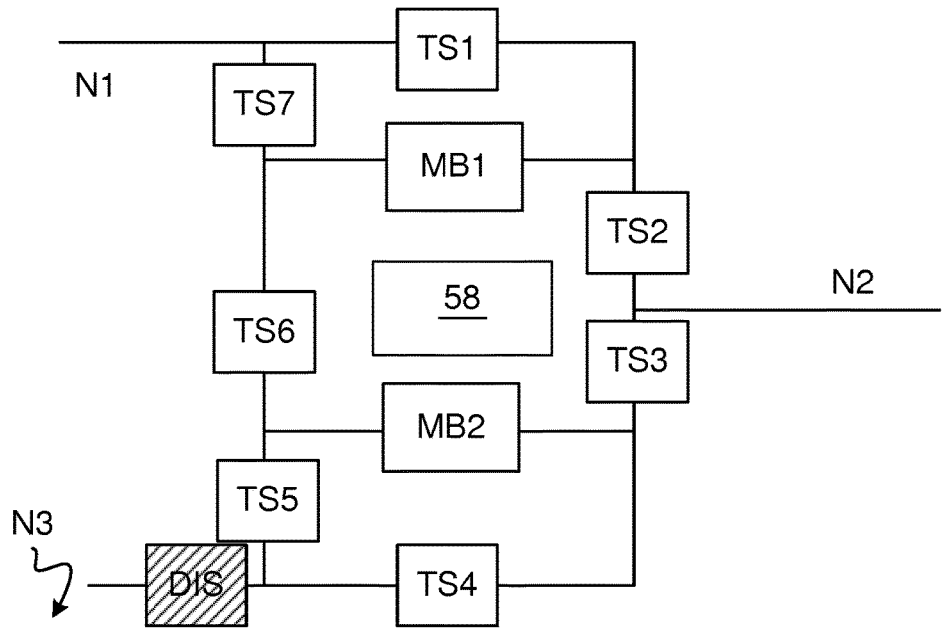
FIG. 12 shows operation of the first switchyard configuration after isolation of the same fault.

A first example of handling a fault in the third network N3 for the three network switchyard configuration will now be given with reference being made to FIGS. 10-12, where FIG. 10 shows operation during the fault, FIG. 11 shows operation during fault current breaking operation and FIG. 12 shows operation after fault isolation. This type of operation is of interest when both of the healthy networks, here exemplified by the first and second networks N1 and N2, are equally strong, i.e. deliver the fault currents that are in the same range to the faulty network N3.

In the example there is a control unit 58 controlling the operation of the transfer switches and the main circuit breakers. It may also control disconnectors in the switchyard. There is also a disconnector 60 connected between the third network N3 and the fourth and fifth transfer switches. This disconnector 60, which may be a conventional disconnector, is provided for disconnecting the third network N3 after fault current isolation. It should here be realized that all networks may be connected to the switchyard via such a disconnector.

The control unit 58 is provided for selecting, upon the occurrence of a fault in a network, fault current paths through the switchyard from the healthy networks to the network with the fault and then to control the transfer to set up the fault current paths.

The transfer switches of the switchyard are in this example controlled in order to make the main circuit breakers share the total fault current. Each circuit breaker may thereby handle the fault current delivered by one DC network. This means that as a fault is detected in the third network N3, for instance through the third network N3 receiving ground potential, the control unit 58 controls the transfer switches so that the fault current from the other networks pass through both the main circuit breakers.

In order to do this, the control unit 58 may open the second, fourth and seventh transfer switches TS2, TS4 and TS7. As can be seen this may involve the control unit 58 opening transfer switches in order to ensure that no healthy network has a direct link with each other, but is connected with the network where the fault is provided via a main circuit breaker. In this specific example, it also involves directing the fault current delivered by the healthy networks through different main circuit breakers. Thereby the two healthy networks N1 and N2 are also isolated from each other.

As can be seen in FIG. 10, there is a first fault current path from the first network N1 to the third network N3, via the first transfer switch TS1, the first main circuit breaker MB1, the sixth transfer switch TS6 and the fifth transfer switch TS5. In a similar manner there is a second fault current path from the second network N2, via the third transfer switch TS3, the second main circuit breaker MB2 and the fifth transfer switch TS5 to the third network N3.

Once these fault current paths have been established via the two main circuit breakers through the selective opening of transfer switches, the control unit 58 then opens the main circuit breakers MB1 and MB2, which is indicated in FIG. 11. As can be seen this main circuit breaker opening is performed when the transfer switches TS2, TS4 and TS7 are open.

The opening of the main circuit breakers MB1 and MB2 causes the fault current to pass through the surge arresters of these circuit breakers and thereby getting quenched. It is then possible for the control unit 58 to open the disconnector 6o as shown in FIG. 12. This opening separates the faulty network N3 from the switchyard and thereby the main circuit breakers MB1 and MB2 may be reclosed, as may the opened transfer switches TS2, TS4 and TS7, which is also shown in FIG. 12. Thereby it is possible to resume limited operation only using the first and second networks N1 and N2.

One obvious aspect that may be noted is that the number of networks separated from each other during the fault clearing depends on the number of main circuit breakers used to clear the fault. In the example given above where current sharing by two main circuit breakers was made, both the healthy networks were separated from each other during fault clearing. After the fault was cleared, the healthy networks where reconnected through transfer switches and main breakers. If this fault current sharing principle is applied in a bigger switchyard (more than three terminals), the separation will be a separation in two groups of networks. However, the separation will only stay in place during the fault clearing and after the fault is cleared, all healthy networks will get reconnected for normal operation.

It can here also be mentioned that, assuming that the same relationship between the fault current delivered by the healthy DC networks, similar operation may be provided in case there is a fault in the first or the second networks N1 and N2.

Figure 13:
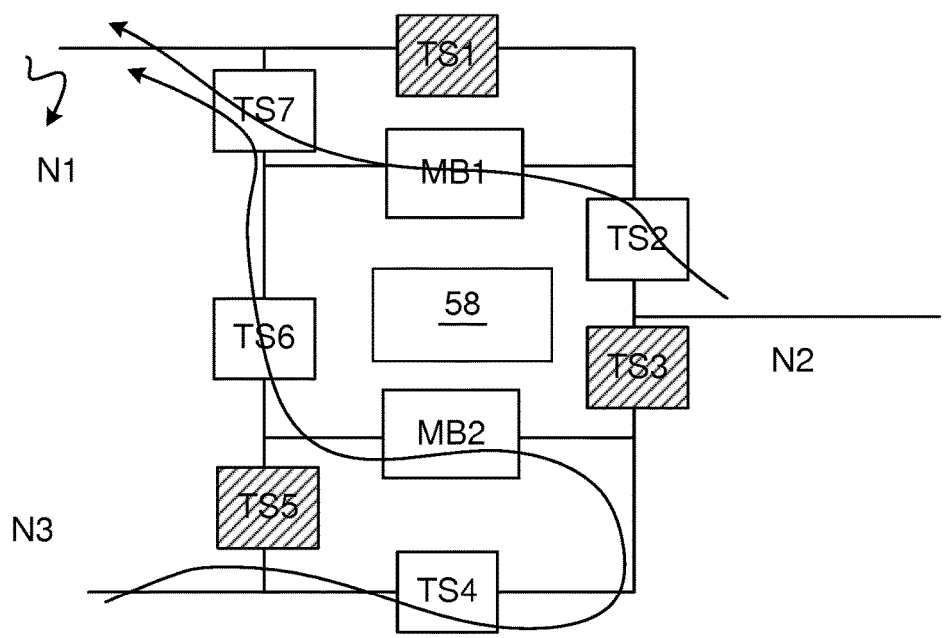
FIG. 13 shows operation of the first switchyard configuration during a fault in a first network.

In case there is a fault in the first network N1, which is shown in FIG. 13, the first, third and fifth transfer switches TS1, TS3 and TS5 may in a similar manner be opened in order to provide a first fault current path from the second network N2 to the first network N1 via the second transfer switch TS2, the first main circuit breakers MB1 and the seventh transfer switch TS7 and a second fault current path from the third network N3 to the first network N1 via the fourth transfer switch TS4, the second main circuit breaker MB2, the sixth transfer switch TS6 and the seventh transfer switch TS7.

Figure 14:
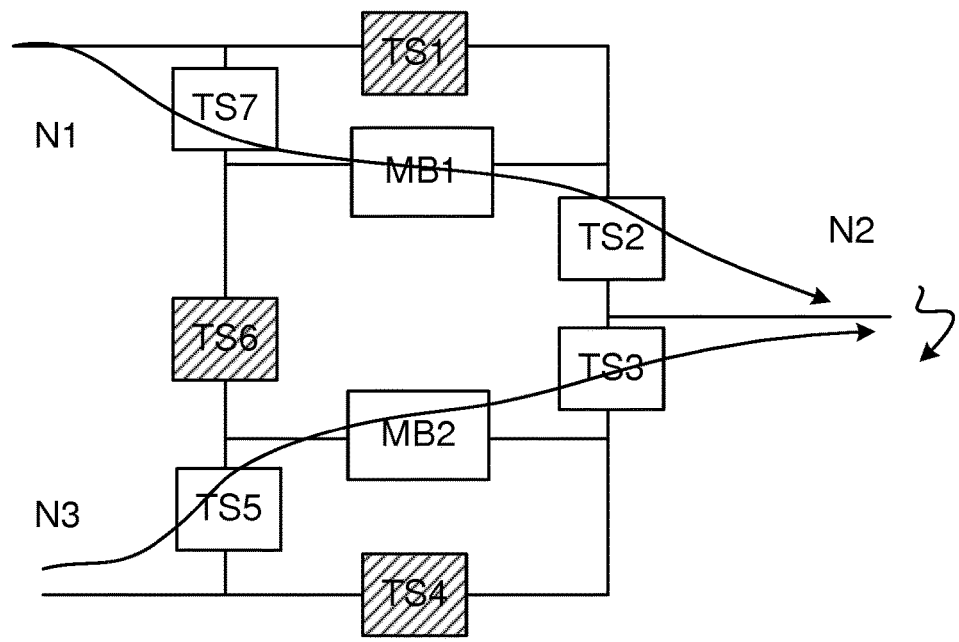
FIG. 14 shows operation of the first switchyard configuration during a fault in a second network.

In case there is a fault in the second network N2, which is shown in FIG. 14, the first, fourth and sixth transfer switches TS1, TS4 and TS6 may be opened in order to provide a first fault current path from the first network N1 to the second network N2 via the seventh transfer switch TS7, the first main circuit breakers MB1 and the second transfer switch TS2 and a second fault current path from the third network N3 to the second network N2 via the fifth transfer switch TS5, the second main circuit breaker MB2 and the third transfer switch TS3.

Figure 15:
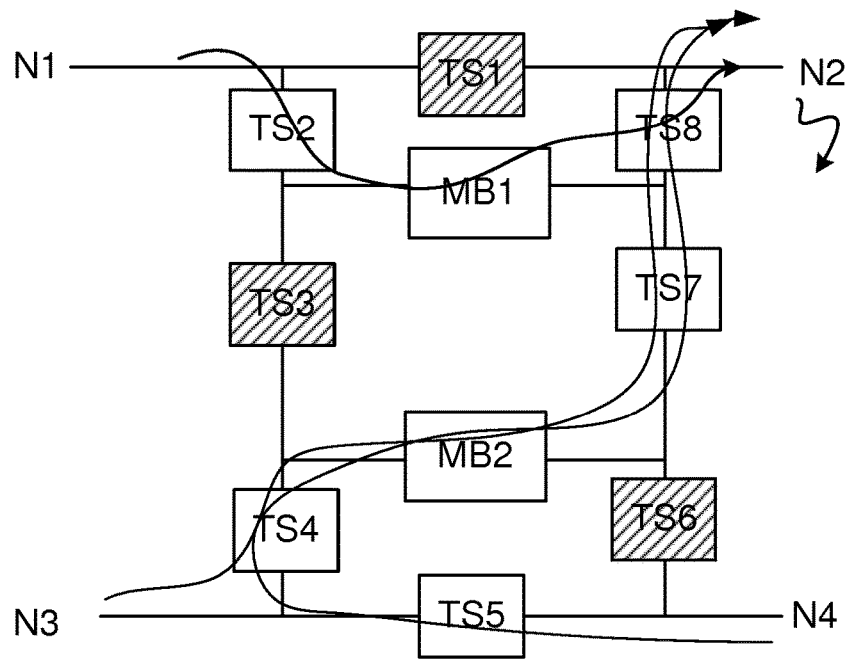
FIG. 15 shows operation of the second switchyard configuration during a fault in the second network with fault current sharing by the main circuit breakers.

A similar type of operation when there is a fault in the second network N2, in the switchyard connected to four different networks is schematically shown in FIG. 15. In this case the first third and sixth transfer switches TS1, Ts3 and TS6 are opened in order to provide three fault current paths to the faulty network N2 via the two main circuit breakers MB1 and MB2. In this case there is a first fault current path from the first network N1 to the second network N2 via the second transfer switch TS2, the first main circuit breaker MB1 and the eighth transfer switch TS8, a second fault current path from the third network N3 to the second network N2 via the fourth transfer switch TS4, the second main circuit breaker MB2 and the seventh transfer switch TS7 and a third fault current path from the fourth network N4 to the second network N2 via the fifth transfer switch TS5, the fourth transfer switch TS4, the second main circuit breaker MB2 and the seventh transfer switch TS7.

Similar type of operation is possible in case there is a fault in any of the other networks.

It can be noted that in the fault current handling examples given above, the control unit, when selecting fault current paths selected at least two main circuit breakers that were to divide the fault current paths among themselves so that at least one fault current path ran through one of the selected main circuit breakers and another fault current path ran through another selected main circuit breaker.

In the situation depicted in FIG. 15, it can also be noted that the second and third fault current paths both go through the second main circuit breaker MB2. The fault current from more than one network may thus pass through one main circuit breaker.

The provision of more than one fault current path through a main circuit breaker may be used also in a switchyard of the first configuration. It is for instance possible to make the fault currents delivered by the first and second network to the faulty network N3 in FIG. 10 pass through one main circuit breaker, for instance through the first main circuit breaker MB1. This may be achieved through the control unit 58 opening the third transfer switch Ts3 instead of the second transfer switch TS2. Alternatively the second main circuit breaker MB2 may be used through both the second and third transfer switches TS2 and TS3 remaining closed while opening the sixth transfer switch TS6 (where the fourth and seventh transfer switches are already open).

Figure 16:
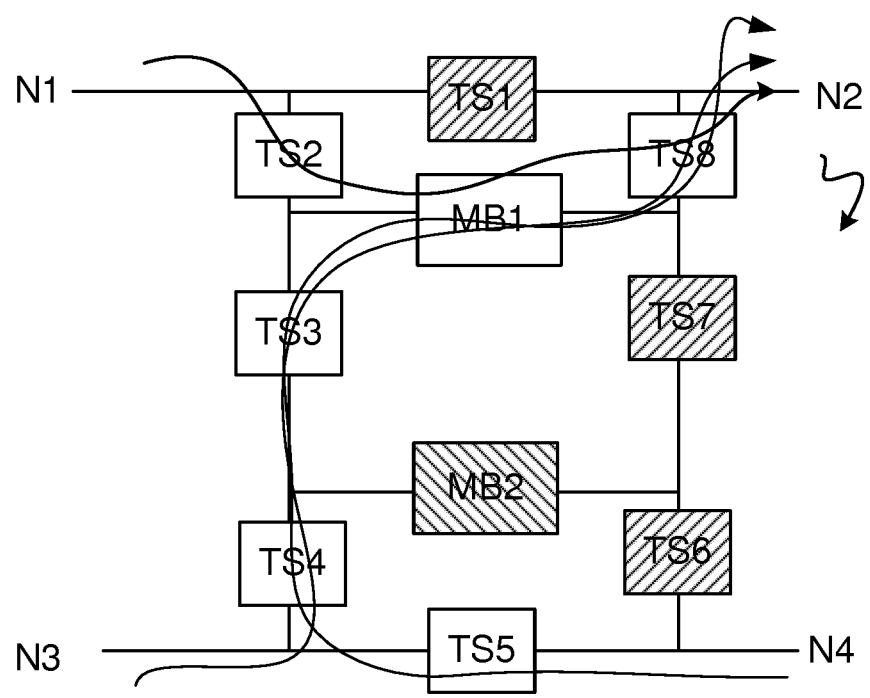
FIG. 16 shows operation of the second switchyard configuration during a fault in the second network using only one of the main circuit breakers.

An example of the same principle for the second switchyard configuration is shown in FIG. 16, where the first, sixth and seventh transfer switches TS1, TS6 and TS7 are open while the second, third, fourth, fifth and eighth transfer switches TS2, TS3, TS4, TS5 and TS8 are closed in case of a fault in the second network N2.

As can be seen in FIG. 16, there is a first fault current path from the first network N1 to the second network N2 via the second transfer switch TS2, the first main circuit breakers MB1 and the eighth transfer switch TS8, a second fault current path from the third network N3 to the second network N2 via the fourth transfer switch TS4, the third transfer switch TS3, the first main circuit breaker MB1 and the eighth transfer switch TS8 and a third fault current path from the fourth network N4 to the second network N2 via the fifth transfer switch TS5, the fourth transfer switch TS4, the third transfer switch TS3, the first main circuit breaker MB1 and the eighth transfer switch TS8.

Thereby all fault current paths go through the first main circuit breaker MB1, while the second main circuit breaker MB2 is not used. This also means that the selecting of fault current paths performed by the control unit in this caser comprises selecting a main circuit breaker through which all fault current paths are to pass. This operation has the further advantage of the healthy networks remaining connected to each other at all times.

It is in fact possible for the control unit to determine how many and which main circuit breakers are to be used based on the fault current delivery properties of the healthy DC networks.

The control unit 58 may thus select for each healthy DC network, when selecting fault current paths, a main circuit breaker the corresponding fault current path is to pass based on at least one fault current delivery property of that DC network.

The shape of the fault current delivered by a DC network may depend on the strength of the network as well as on the distance of the current source of this network from the switchyard. This means that the magnitude of the fault current may depend on the strength of the DC network, while the rise time to this magnitude may depend on the line length from the current source, such as the transmission line length between the energy source of the healthy DC network and the corresponding DC terminal of the switchyard, which energy source may be a converter generating the fault current. The fault current magnitude may thus be one fault current delivery property and the distance between the energy source of the network and the switchyard another fault current delivery property. It should here also be realized that a DC network may be strong or weak because it is connected to a strong or weak AC network.

Furthermore, these properties of the connected DC networks may be known beforehand and it is therefore possible to also know the fault current contribution from the healthy DC networks to a faulty DC network beforehand. This knowledge may be used to select the number of and which main circuit breakers that are to be receive the fault currents in case of a fault on a certain network. As an alternative it is possible to determine the properties at the occurrence of a fault, for instance through measuring the fault currents.

It can thus be seen that the control unit may divide or combine the fault currents through the main breakers based on fault current strength.

It is in some cases of interest to temporarily disconnect a main circuit breaker for maintenance. It is possible to disconnect the whole branch in which a main circuit breakers is connected through the use of disconnectors DIS1 and DIS2 as shown in FIG. 5.

If for instance the first main circuit breaker MB1 in the switchyard according to the second configuration shown in FIG. 9 is disconnected for maintenance, normal operation can be continued without the branch comprising the first main circuit breaker MB1 with all transfer switches and all remaining main circuit breakers MB2 closed.

If in this case there is a fault in the first network N1, the transfer switches TS1 and TS4 may be operated by the control unit to commutate the fault current to the second main circuit breaker MB2. Fault clearing may then be performed through opening of the second main circuit breaker MB2. The faulty network is disconnected by a disconnector (not shown) connected between the first network N1 and the first and second transfer switches TS1 and TS2 and then the first and fourth transfer switches TS1 and TS4 may be re-closed. The remaining healthy networks are connected and the switchyard is ready to act against another fault.

Similarly the switchyard according to the first configuration of FIG. 8 can be operated with one main breaker while the other is taken for maintenance.

It is also possible to handle the case of a circuit breaker failing while there is a network fault. This means that the control unit may control the transfer switches to change a fault current path that runs through a failing main circuit breaker to instead run through a functioning main circuit breaker.

Handling of circuit breaker failure will now be described in relation to two different types of switchyard operation. Circuit breaker failure may take place both in case fault currents are shared by a main circuit breaker or in case fault currents run through separate main circuit breakers.

This may be exemplified for the first switchyard configuration in FIG. 8.

In case for example the fault currents from the first and third networks N1 and N3 are both to pass through the second main circuit breaker MB2 in case of a fault in the second network N2, the transfer switches TS1, TS2 and TS4 may be operated to commutate the current in through MB2. The transfer switches TS1, TS2 and TS4 are thus opened. It is now assumed that the second main circuit breaker MB2 failed to open and it is therefore required to transfer the total current to the first main circuit breaker MB1. Upon the control unit detecting such a main circuit breaker failure, it then controls the second transfer switch TS2 to be closed and the third transfer switch TS3 to be opened. Thereby no fault current can any longer pass through the second main circuit breaker MB2, but instead has to run through the first main circuit breaker MB1. Once the fault is cleared and isolated MB2 can be taken out of service for maintenance as described above.

In case the fault current from the first network N1 is to pass through the first main circuit breaker MB1 and the fault current from the third network N3 is to pass through the second main circuit breaker MB2 in the case of a fault in the second network N2, transfer switches TS1, TS4 and TS6 are operated to commutate the current in the two main breakers MB1 and MB2. These transfer switches TS1, TS4 and TS6 are thus opened.

If it is now assumed that the second main circuit breaker MB2 failed to open and it is required to transfer the total current to the first main circuit breaker MB1, the control unit may close the sixth transfer switch TS6 and open the third transfer switch TS3. Thereby the total fault current for the third network N3 is directed through the first main circuit breaker MB1.

Similarly in case of failure of the first main circuit breaker MB1, the current can be bypassed though MB2. In this case, the control unit may close the sixth transfer switch TS6 and open the second transfer switch TS2.

Once the fault is cleared and isolated, the faulty main circuit breaker may be taken for maintenance as described above.

It can in this case be seen that the transfer switches have also been controlled for minimizing back-to-back opening and closing cycles, i.e. for avoiding a transfer switch being operated to open again immediately after having been previously opened and closed. In both cases one transfer switch was closed and another opened when changing fault current path because of a breaker failure. It was possible to avoid any transfer switch from first opening, then having to be closed because a selected main circuit breaker was faulty and thereafter being opened again for redirecting the fault current through the switchyard. All transfer switches can thus in this case be operated to at a maximum open and close only once in regard to fault current handling and faulty network isolation despite the fact that a selected main circuit breaker is faulty.

The current breaking ability of the main circuit breaker influences the cost of the component. A full rated circuit breaker (which is capable of breaking the total fault current) increases maintainability and protection range in terms of fault current magnitudes. However, the cost increases. It is possible to de-rate the main breaker to a lower current breaking ability, i.e. to lower the rating of the circuit breaker in question. This may save costs but the maintainability or back up breaker for primary breaker failure may not be available.

Depending on application and connected network strength in terms of fault current source, it could be possible to combine different rated main breakers in one switchyard. This is explained with the example below.

Reference is again being made to the three network switchyard shown in FIG. 9 where the first main circuit breaker MB1 is a de-rated main breaker, which has lower rating and thus a lower current breaking ability compared to the second main circuit breaker MB2. It is in this case possible that the second main circuit breaker MB2 is able to break the total fault current, while the first main circuit breaker MB1 is assumed to only be able to break a part of the fault current.

This may be of advantage if some of the networks are weaker than the others, in which case it is possible to let a circuit breaker with lower current rating be used for fault currents from such weaker networks.

The proposed switchyard is scalable and adaptable to changes such as the addition of further DC networks and main circuit breakers. The components (main breaker and transfer switches) number depends on number of connections as well as quality of service in terms of (maintainability, breaker failure etc.).

The number of transfer switches needed in a switchyard may more particularly be expressed as:

$$x=y+2*z,$$

where x is the number of transfer switches, y is the number of networks and z is the number of man circuit breakers.

The invention has a number of advantages. It combines two or more main circuit breakers with multiple transfer switches in order to build a switchyard with current sharing possibility while at the same time ensuring maintainability as well as back up for breaker failure. Furthermore, the fault current flow through the switchyard can be changed depending on the fault location and strength of the connected network.

The invention also has a number of further advantages.

Maintainability is improved because maintenance of a main circuit breaker can take place without disrupting switchyard operation.

N−1 security is ensured with lower number of main breakers (in case of main breaker failures and back up breakers availability) compared to conventional switchyard configurations.

Fault current sharing among the main breakers ensures higher protection ranges in terms of fault current.

The number of used components is reduced because a lower number of main circuit breakers is used compared to conventional switchyards and since different ratings can be used for these circuit breakers.

It can thus be seen that different types of fault current handling with hybrid DC breaker is proposed. The current sharing may be controlled through appropriate operation of the transfer switches. The flexibility of the fault current sharing and use of main breakers may also offer two different possible operations strategies:

Use of full rated breakers: Maintainability of the main breakers, back up breaker for breaker failure and higher protection range in terms of fault current.

Use of de-rated breakers: De-rating of the main breakers to reduce cost.

A combination of full rated and de-rated breaker can also be used based on applications.

The control unit may furthermore be provided in the form of a processor with associated program memory including computer program code for performing its functionality.

A computer program may also be a computer program product, for instance in the form of a computer readable storage medium or data carrier, like a CD ROM disc or a memory stick, carrying such a computer program with the computer program code, which will implement the functionality of the above-described control unit.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A switchyard for interconnecting at least three direct current power networks, the switchyard comprising a number of interconnected entities comprising:
  at least two main circuit breakers, and
  a number of transfer switches,
  wherein
  each network has two connections to the switchyard, each provided via a transfer switch,
  each main circuit breaker has four connections in the switchyard, two at each end of the main circuit breaker each provided via a transfer switch, and
  each network is joined with every other network via a corresponding path through at least one main circuit breaker as well as via a corresponding path bypassing all main circuit breakers,
  thereby
  each main circuit breaker is connected between two networks via two network interconnecting transfer switches, one on each side of the main circuit breaker, where there is at least one bypass branch in parallel with the main circuit breaker, which bypass branch comprises a bypass transfer switch and is connected between the two network interconnecting transfer switches, and
  there is at least one circuit breaker interconnecting branch between the two circuit breakers and comprising a circuit breaker interconnecting transfer switch.

2. The switchyard according to claim 1, wherein each network only has two connections to the switchyard and each main circuit breaker only has four connections in the switchyard.

3. The switchyard according to claim 1, wherein a connection of one entity that is joined with a connection of another entity share transfer switch.

4. The switchyard according to claim 1, wherein a first connection of a first network is joined with a first connection of a first main circuit breaker at a first end of the first circuit breaker.

5. The switchyard according to claim 4, wherein a second connection of the first main circuit breaker at the first end is joined with a first connection of a second main circuit breaker at the first end of the second main circuit breaker.

6. The switchyard according to claim 5, wherein a second connection of the first network is joined with a third connection of the first main circuit breaker at a second end of the first circuit breaker.

7. The switchyard according to claim 6, wherein a fourth connection of the first main circuit breaker at the second end is joined with a first connection of a second network.

8. The switchyard according to claim 5, wherein a first connection of a second network is joined with a third connection of the first main circuit breaker at a second end of the first circuit breaker and a second connection of the first network is joined with a second connection of the second network.

9. The switchyard according to claim 8, wherein a fourth connection of the first main circuit breaker at the second end is joined with a second connection of the second main circuit breaker at the second end of the second main circuit breaker.

10. The switchyard according to claim 1, wherein each network is joined with every other network via a corresponding path through at least one main circuit breaker as well as via a corresponding path bypassing all main circuit breakers when all main circuit breakers are operational.

11. A direct current power transmission system comprising a switchyard according to claim 1.

12. The switchyard according to claim 2, wherein a connection of one entity that is joined with a connection of another entity share transfer switch.

13. The switchyard according to claim 2, wherein a first connection of a first network is joined with a first connection of a first main circuit breaker at a first end of the first circuit breaker.

14. The switchyard according to claim 3, wherein a first connection of a first network is joined with a first connection of a first main circuit breaker at a first end of the first circuit breaker.

15. The switchyard according to claim 2, wherein each network is joined with every other network via a corresponding path through at least one main circuit breaker as well as via a corresponding path bypassing all main circuit breakers when all main circuit breakers are operational.

16. The switchyard according to claim 3, wherein each network is joined with every other network via a corresponding path through at least one main circuit breaker as well as via a corresponding path bypassing all main circuit breakers when all main circuit breakers are operational.

17. The switchyard according to claim 4, wherein each network is joined with every other network via a corresponding path through at least one main circuit breaker as well as via a corresponding path bypassing all main circuit breakers when all main circuit breakers are operational.

18. The switchyard according to claim 5, wherein each network is joined with every other network via a corresponding path through at least one main circuit breaker as well as via a corresponding path bypassing all main circuit breakers when all main circuit breakers are operational.

19. The switchyard according to claim 6, wherein each network is joined with every other network via a corresponding path through at least one main circuit breaker as well as via a corresponding path bypassing all main circuit breakers when all main circuit breakers are operational.

20. The switchyard according to claim 7, wherein each network is joined with every other network via a corresponding path through at least one main circuit breaker as well as via a corresponding path bypassing all main circuit breakers when all main circuit breakers are operational.

* * * * *